US011009354B2

(12) United States Patent
Ashar et al.

(10) Patent No.: US 11,009,354 B2
(45) Date of Patent: May 18, 2021

(54) DETERMINING A LAYOUT IN A LIVING SPACE

(71) Applicant: Nuro Technologies, Inc., San Jose, CA (US)

(72) Inventors: Premal Ashar, Sunnyvale, CA (US); Vaibhavi Ashar, Sunnyvale, CA (US)

( * ) Notice: Subject to any disclaimer, the term of this patent is extended or adjusted under 35 U.S.C. 154(b) by 4 days.

(21) Appl. No.: 16/028,012

(22) Filed: Jul. 5, 2018

(65) Prior Publication Data

US 2019/0011268 A1 Jan. 10, 2019

Related U.S. Application Data

(60) Provisional application No. 62/529,084, filed on Jul. 6, 2017.

(51) Int. Cl.
| | |
|---|---|
| *G01C 21/20* | (2006.01) |
| *H04W 4/029* | (2018.01) |
| *G01J 5/00* | (2006.01) |
| *H04L 12/28* | (2006.01) |
| *G01S 17/04* | (2020.01) |

(52) U.S. Cl.
CPC .......... *G01C 21/206* (2013.01); *G01J 5/0025* (2013.01); *G01S 17/04* (2020.01); *H04L 12/2812* (2013.01); *H04W 4/029* (2018.02)

(58) Field of Classification Search
CPC .. G01C 21/206; H04L 12/2812; G01J 5/0025; H04W 4/029; G01S 17/026
See application file for complete search history.

(56) References Cited

U.S. PATENT DOCUMENTS

| | | | |
|---|---|---|---|
| 2014/0094936 A1* | 4/2014 | Saunders | G05B 15/02 700/17 |
| 2016/0258760 A1* | 9/2016 | Beaumont | G01C 21/206 |
| 2016/0271795 A1* | 9/2016 | Vicenti | G05D 1/0274 |

\* cited by examiner

*Primary Examiner* — Yuen Wong
(74) *Attorney, Agent, or Firm* — Joseph L. Acayan (57) ABSTRACT

Implementations generally relate to systems, apparatuses, and methods for a determining a layout of a living space. In some implementations, a residential sensor device performs operations including receiving activity information collected by the one or more sensors, where the activity information includes sensed activity of one or more users at one or more user locations of a plurality of user locations. The residential sensor device further performs operations including determining one or more routes in the living space based on one or more sets of user locations of the plurality of user locations. The residential sensor device further performs operations including determining one or more object locations of one or more objects in the living space based on the one or more routes.

20 Claims, 7 Drawing Sheets

DETERMINING A LAYOUT IN A LIVING SPACE

BACKGROUND

Home automation has been a long-term desire. Control systems enable aspects of a home such as lighting to be controlled. However, cost-effective and user-friendly home automation is still far away. Present home automation systems are expensive, hard to install, and difficult to update. Such home automation systems typically require a user to understand complicated and difficult instructions to control aspects of a home.

SUMMARY

Implementations generally relate to devices, apparatuses, and methods for determining a layout in a living space. In some implementations, a residential sensor device includes one or more sensors operative to sense activity in a living space. The residential sensor device also includes one or more processors, and logic encoded in one or more non-transitory computer-readable storage media for execution by the one or more processors. The logic when executed is operable to perform operations including receiving activity information collected by the one or more sensors, wherein the activity information includes sensed activity of one or more users at one or more user locations of a plurality of user locations. The logic when executed is further operable to perform operations including determining one or more routes in the living space based on one or more sets of user locations of the plurality of user locations. The logic when executed is further operable to perform operations including determining one or more object locations of one or more objects in the living space based on the one or more routes.

Other aspects and advantages of the described implementations will become apparent from the following detailed description, taken in conjunction with the accompanying drawings, illustrating by way of example the principles of the described implementations.

DETAILED DESCRIPTION

Implementations generally relate to systems, apparatuses, and methods for determining a layout in a living space. As described in more detail below, various implementations of a residential sensor device platform provide an infrastructure within and around a residence that includes sensor-enabled devices within rooms of the residence, as well as the exterior to the residence.

In some implementations, a residential sensor device determines a layout in a living space by performing operations including receiving activity information collected by the one or more sensors. In various implementations, sensors may include passive infrared (PIR) sensors or equivalent sensors. As described in more detail herein, various software techniques may be used to plot a layout of a living space.

The activity information includes sensed activity of one or more users at one or more user locations. The residential sensor device further performs operations including determining one or more routes in the living space based on one or more sets of user locations. The residential sensor device further performs operations including determining one or more object locations of one or more objects in the living space based on the one or more routes. As a result, the residential sensor device determines a unique signature of a living space. Implementations described herein enable a living space layout to be determined without the use of a camera, which reduces or eliminates privacy concerns.

Note that the reference to the phrase "living space" or "living area" may include indoor and outdoor spaces, depending on the particular implementations. Furthermore, in some implementations, the residential sensor device platform provides learning of common usage patterns by tracking and learning of routine and pattern-based activity that eventually, and automatically configures home automation in order to determine the occurrence of intrusions in a home. Some implementations provide the sensing of motion or activity, temperature, and daylight. Further, some implementations provide features, autonomous and networked operation, and cloud intelligence.

As described in more detail herein, implementations provide distributed decision making intelligence at each sensor device for day-to-day use, as well as a network for advanced analytics and pattern and behavior learning. Implementations also provide an intelligent wireless mesh that is self-healing, self-learning, and expandable. Implementations also provide sensor devices in each room or living area of a residency, as well as external to a residency, where the sensor devices provide living area usage information such a layouts of living space or areas. Knowledge of living space layouts may facilitate various services associated with activity tracking, ambient light, temperature, energy metering, camera, air quality, carbon monoxide (CO) detection, etc. Implementations also provide an efficient, cost-effective, and user-friendly home Internet of Things (IoT) platform including ubiquitous digital, plug and play sensing, stand-alone operation, Wi-Fi mesh, distributed algorithms, self-learning, self-healing, etc.

Figure 1:
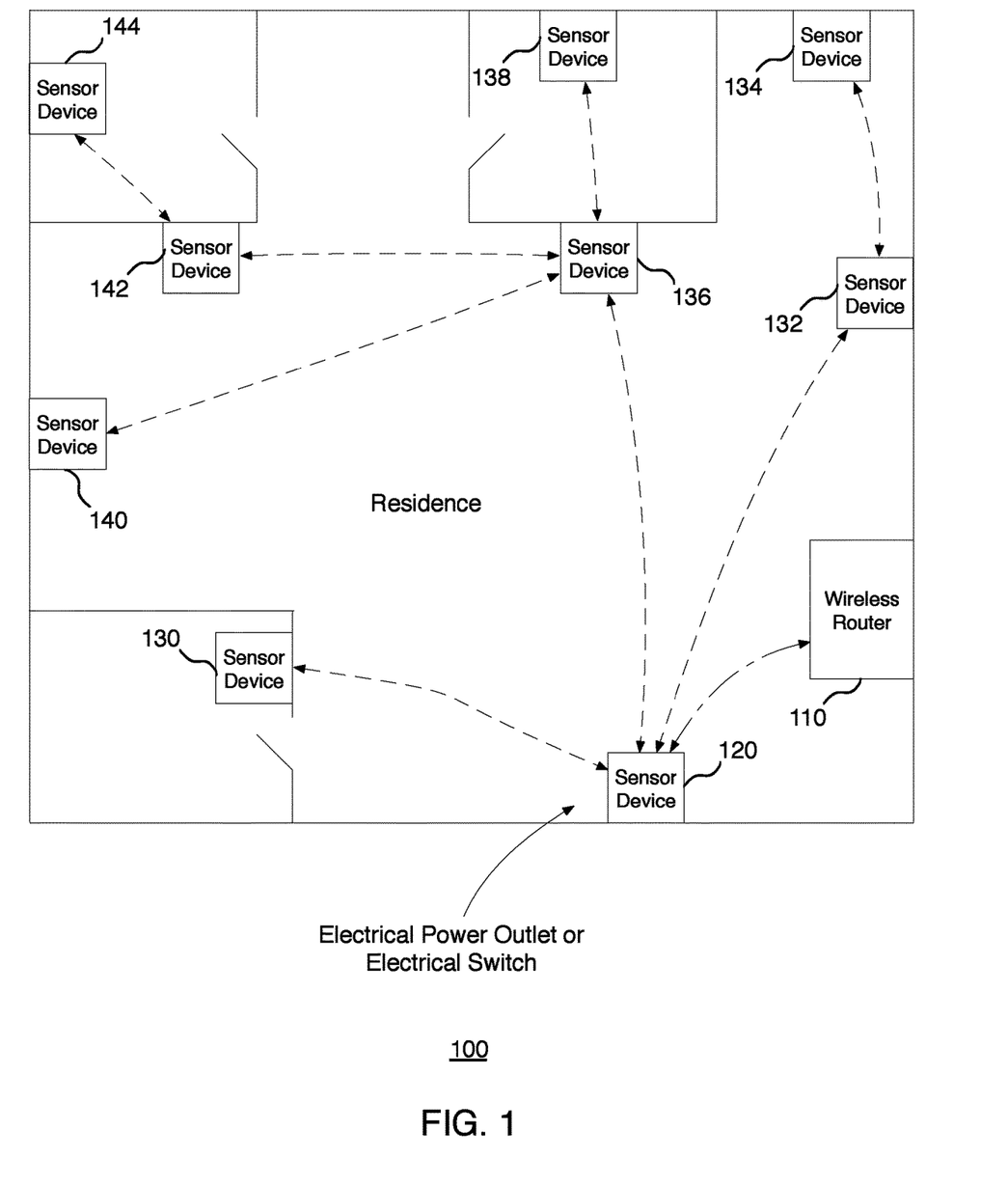
FIG. 1 illustrates a block diagram of an example residential sensor device platform, according to some implementations.

FIG. 1 illustrates a block diagram of an example residential sensor device platform 100, according to some implementations. In some implementations, the residential sensor device platform 100 includes a wireless router 110 and multiple sensor devices 120, 130, 132, 134, 136, 138, 140, 142, and 144. In various implementations, sensor devices 120, 130, 132, 134, 136, 138, 140, 142, and 144 form a wireless mesh network. In various implementations, at least one sensor of sensor devices 120, 130, 132, 134, 136, 138, 140, 142, and 144 maintains a communication link with wireless router 110.

In various implementations, sensor devices 120, 130, 132, 134, 136, 138, 140, 142, and 144 may be a part of and/or integrated with a stationary device in a residence. Such a stationary device may be an electrical switch such as a light switch, a power outlet, or other stationary devices. While implementations are described herein in the context of wall mounted stationary devices, these implementations and other also apply to other types of stationary devices (e.g., table top devices or other surface top devices, as well as appliances).

In some implementations, one sensor device of sensor devices 120, 130, 132, 134, 136, 138, 140, 142, and 144 is operative as a master sensor device, which maintains the communications link with wireless router 110. As shown, in this particular implementation, sensor device 120 maintains the communication link with wireless router 110. As such, sensor device 120 may be referred to as a master sensor device. The other sensor devices 130, 132, 134, 136, 138, 140, 142, and 144 may be referred to as slave sensor devices.

In various implementations, the sensor device that is operative as the master sensor device may change over time. For example, as described in more detail below, if a master sensor device fails, another sensor device may be selected from among the sensor devices to be operative as the new master sensor device.

In some implementations, the non-master sensor devices 130, 132, 134, 136, 138, 140, 142, and 144 form a wireless mesh network. In various implementations, the master sensor device (e.g., sensor device 120) is also a part of the wireless mesh network. For example, in this case, master sensor device 120 and non-master sensor devices 130, 132, 134, 136, 138, 140, 142, and 144 form a wireless mesh network.

In some implementations, other devices (e.g., a mobile device, third-party device, etc.) may also be a part of the wireless mesh network. In some implementations, such other devices may join the wireless mesh network based on authentication. In some implementations, authentication may be controlled with layer two (L2) MAC pre-authorization for network access. In some implementations, authentication may be controlled by higher-level cloud authentication to enable services.

As shown in FIG. 1, in various implementations, each of non-master sensor devices 130, 132, 134, 136, 138, 140, 142, and 144 are either directly coupled to master sensor device 120, or are indirectly coupled to master sensor device 120 through another of the non-master sensor devices. In some implementations, the wireless mesh network operates over at least one link or interface that is different from a link or interface that is the communication link between master sensor device 120 and wireless router 110.

In various implementations, residential sensor device platform 100 is self-healing. For example, any sensor device may function as a master sensor device. If a particular master sensor device becomes inoperable, another sensor device may take over as the master sensor device. In other words, the role of a master sensor device may change over time. In some implementations, the master sensor device may be the sensor device closest to the wireless router. In some implementations, the master sensor device may be the sensor device that first detects a motion or activity.

As shown by the exemplary residential sensor device platform 100 of FIG. 1, sensor devices 130, 132, and 136 are directly coupled to master sensor device 120. Furthermore, as shown, sensor devices 134, 140, and 142 are indirectly coupled to master sensor device 120 through sensor devices 130, 132, and 136. Sensor devices 130, 132, and 136 can be designated as first order wireless mesh network nodes that are one wireless hop from master sensor device 120. Sensor devices 134, 140, and 142 can be designated as second order wireless mesh nodes that are two wireless hops from master sensor device 120. Furthermore, sensor device 144 is indirectly coupled to the master sensor device through sensor devices 142, and can be designated as a third order wireless mesh node that is three wireless hops from master sensor device 120.

In various implementations, the sensor device may detect not only sensed occupancy but may also detect activity, and distinguish among different objects such as humans, pets, robots, appliances, machinery, etc. For example, the sensor device may determine room usage based on movement patterns, type of motion or activity, size or magnitude of motion or activity, etc. In various implementations, the sensor device may detect particular activities in human behavior that occur in the living space (e.g., walking, running, falling, etc.). Based on this activity information, the sensor device may determine if the occupant is a person, pet (e.g., dog, cat, etc.), or other object.

In some implementations, one or more processors of the one or more of the sensor devices 120, 130, 132, 134, 136, 138, 140, 142, and 144 are operative to monitor the behavior of users of the living space, to receive and store the sensed condition over time, and to analyze the sensed condition to identify user behavior. In various implementations, local decisions and control are performed due to processing at each device. In other words, there is no network dependency to perform implementations described herein. In various implementations, multiple load settings may be achieved due to sensing, decisions, and controls residing on the same device.

In some implementations, the wireless mesh network further includes non-sensor devices that communicate with at least a portion of the sensor devices of the wireless mesh network. Such non-sensor devices can include alarm systems.

Figure 2:
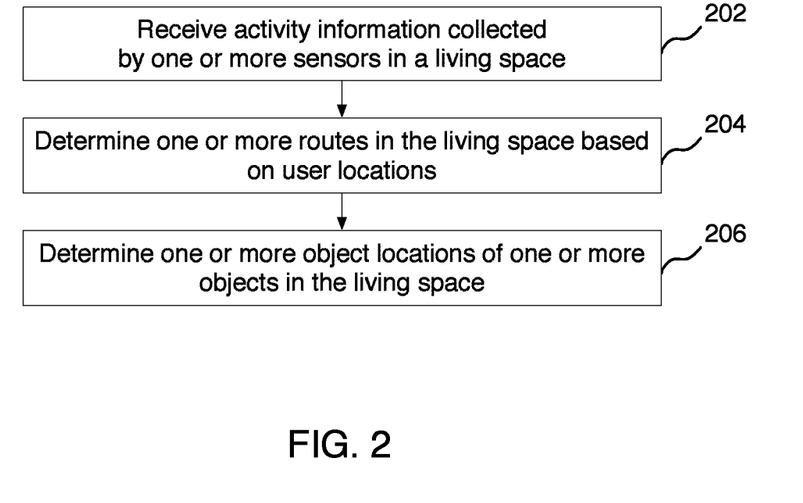
FIG. 2 illustrates an example flow diagram for determining a layout in a living space, according to some implementations.

FIG. 2 illustrates an example flow diagram for determining a layout in a living space, according to some implementations. As described in more detail herein, a residential sensor device determines a unique signature of a living space in terms of a layout of the living space. Implementations described herein enable a living space layout to be determined without the use of a camera, which reduces or eliminates privacy concerns. Referring to both FIGS. 1 and 2, a method is initiated at block 202, where sensor device 130 receives activity information collected by the one or more sensors in a living space. For example, sensor device 130 determines where a user moves or walks in the living space, including where the user may stand, sit, or lie down. In some implementations, the activity information includes sensed activity of one or more users at one or more user locations. As indicated herein, in various implementations, the one or more sensors may include PIR sensors or equivalent sensors. In some implementations, the one or more sensors may include ultrasonic sensors, microwave sensors, vibration sensors, tomographic sensors, and/or a combination thereof, including PIR sensors. As described in more detail herein, various software techniques may be used information provided by the one or more sensors to plot a layout of a living space.

For ease of illustration, example implementations are described herein in the context of a single sensor device, such as sensor device 130. These implementations and others may apply to any sensor device, such as any one or more sensor devices of FIG. 1.

Figure 3:
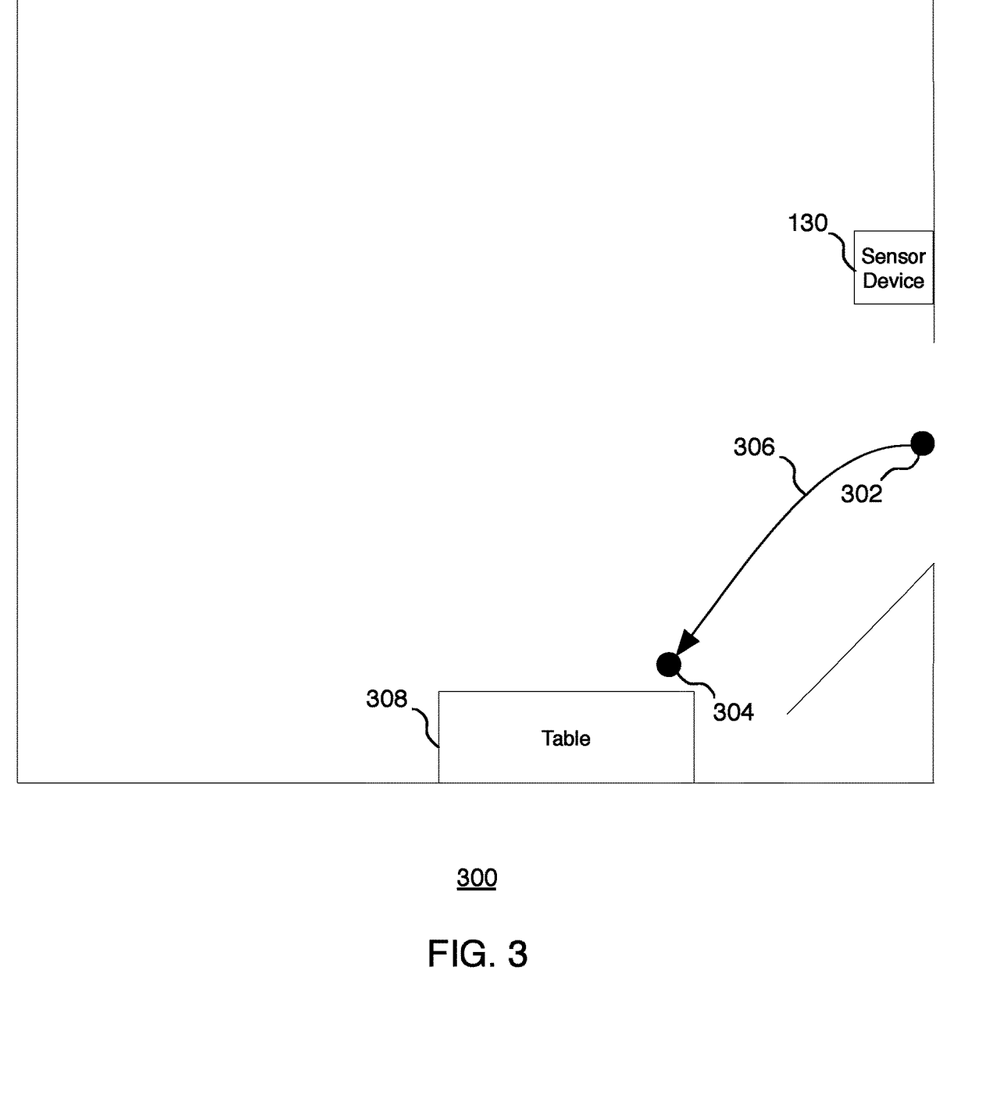
FIG. 3 illustrates a block diagram of a living space, according to some implementations.

FIG. 3 illustrates a block diagram of a living space 300, according to some implementations. Shown are user locations 302 and 304, which represent locations that a user occupies when detected by sensor device 130.

In various implementations, the activity information may include movement information. In various implementations, the movement information may include one or more of location information and time-of-movement information. Based on the movement information, sensor device may determine where a user is located and when the user makes particular movements. For example, in some implementations, sensor device 130 may determine from the movement information user location changes in the living space as the user moves between user locations (e.g., from user location 302 to 304, etc.). Movement information may also include a variety of activity such as a person entering a room, a person making a motion from a still position, etc. In various implementations, the sensor may detect particular activities in human behavior that occur in the living space (e.g., walking, running, falling, etc.). The sensor may detect vertical positions (e.g., standing, etc.), horizontal positions (e.g., lying down, etc.), or a combination of vertical and horizontal positions (e.g., sitting, etc.). For example, a person may stand up from a sitting position. The person may walk across a room. The person may enter a room from another room. In some implementations, sensor device 120 may determine which other room the person came from by obtaining activity information from the last sensor device that detected activity information of the person. In various implementations, sensor device 120 aggregates activity information from itself and other sensor devices if available. Sensor device 120 also automatically sends aggregated activity information to other sensor devices directly and/or via a wireless router.

For ease of illustration, example implementations are described herein in the context of a single user. These implementations and others may also apply to multiple users. As such, sensor device 130 may determine layouts of a given living space based on user locations associated with one or more users. Various example implementations associated with user locations are described in more detail herein.

At block 204, sensor device 130 determines one or more routes in living space 300 based on one or more sets of user locations. In some implementations, sensor device 130 may determine the physical positions of multiple user locations based on relative distances between each of the user locations and the electrical switch sensor device. For example, sensor device 130 may determine if the user is 2 feet away from sensor device 130, if the user moves to 4 feet away from sensor device 130, etc. Because sensor device 130 is in a fixed location, sensor device 130 dynamically tracks changes in user's location (e.g., different user locations) as the user moves around the living space relative to sensor device 130. Example implementations directed to the tracking of different user locations (e.g., a sequence of user locations) are described in more detail herein. As such, sensor device 130 may determine where the user is located in the detectable living space.

As described in more detail herein, sensor device 130 may determine a sequence or series of user locations that create a path or route. Referring again to FIG. 3, as shown, a path or route 306 between user locations 302 and 304 indicates where the user has moved or walked. In various implementations, sensor device 120 may determine if and where the user turns (e.g., left, right, particular directions, etc.). Various example implementations associated with routes are described in more detail herein.

At block 206, sensor device 130 determines one or more object locations of one or more objects in living space 300 based on one or more routes. In various implementations, the object locations are in substantially fixed locations. In various implementations, the user typically moves around the living space in a confined pattern based on the locations of objects such as furniture in the living space. In other words, the user typically walks around furniture. Various particular objects may be in permanently fixed locations (e.g., counters, stairs, etc.), semi-permanently fixed (e.g., tables, appliances, etc.) locations, or non-fixed locations (e.g., chairs, etc.). If any particular object such as a table is moved, a route or portion of a route may changed based on the new object location. As indicated herein, sensor device 130 may determine routes in a given living space based on user locations (e.g., movement of one or more users) and based on object locations.

An example object shown is a table 308, where the user walks from user location 302 up to table 308, or to user location 304. In various scenarios, object locations are different from the user locations in that an object and a user would generally not occupy the same space at the same time. It may be presumed that routes generally surround fixed objects in the space. As such, sensor device 130 may deem locations that do not coincide with a route as being occupied by an object. Exceptions may be were the user sits on a chair or sofa, or lies on a bed. In such scenarios, the user is typically stationary (e.g., not walking). Various example implementations associated with objects are described in more detail herein.

Figure 4:
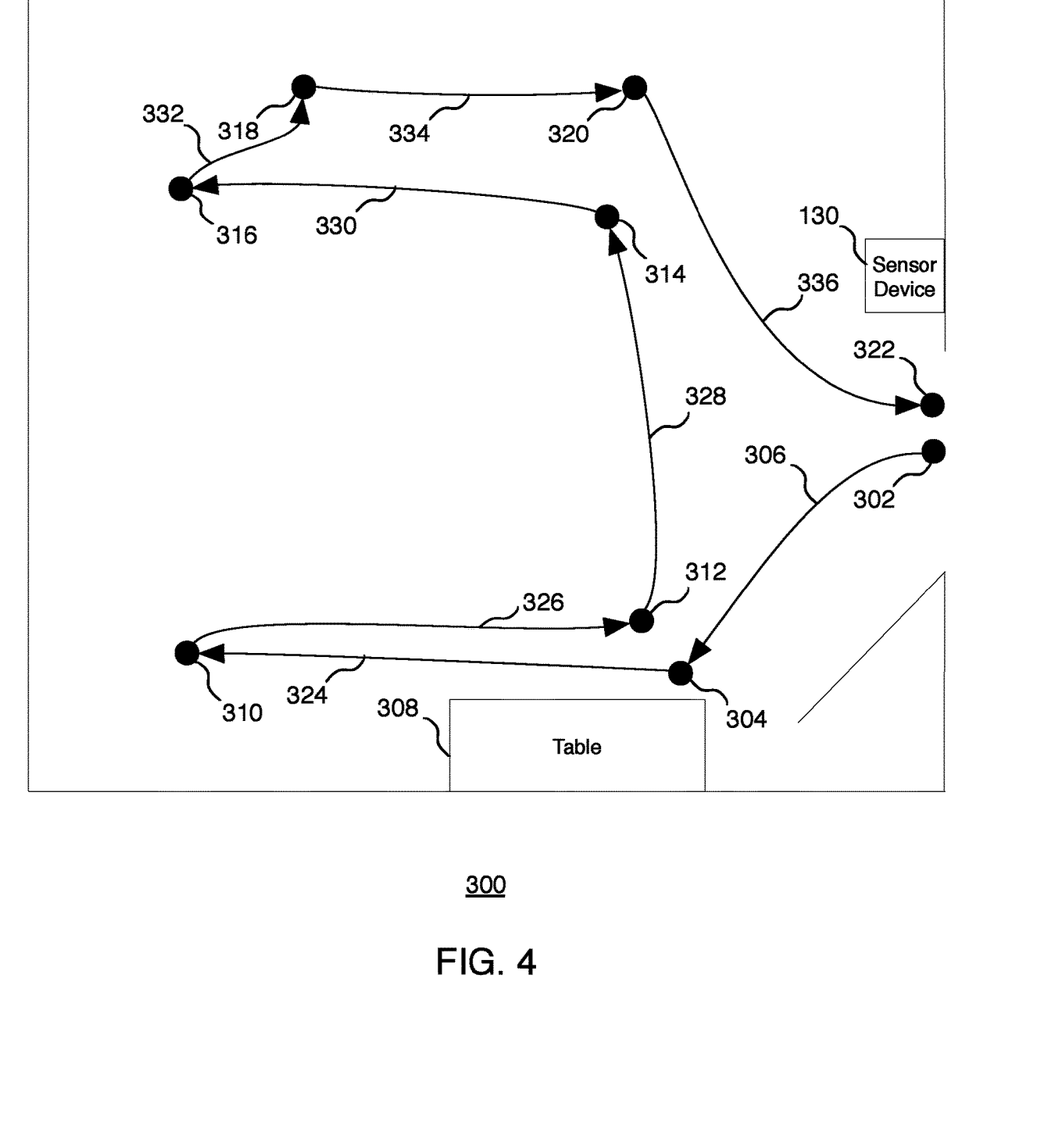
FIG. 4 illustrates a block diagram of a living space, including contiguous user locations and routes in the living space, according to some implementations.

FIG. 4 illustrates a block diagram of living space 300, including contiguous user locations and routes in the living space, according to some implementations. Shown are user locations 302, 304, 310, 312, 314, 316, 318, 320, and 322. These locations are example points or positions in the living space where the user has stopped or passed. The particular number of positions during a given time period may vary and will depend on the particular scenario. Between the user locations are routes 306, 324, 326, 328, 330, 332, 334, and 336. As shown, each route connects two user locations.

In various implementations, sensor device 130 may determine a sequence of contiguous user locations in the living space. For example, a user may be detected as the user enters a room, where the location of first detection is a first or initial user location at user location 302. The user may then walk to table 308, where there may be multiple contiguous user locations between any given pair of user locations. Each location occupied by the user at a given point in time may be considered a user location. For example, each stopping point (e.g., at a table, at a light switch, at a chair, etc.) may be tracked as a different user location. In some implementations, each step a user takes may be tracked as different user location. The particular frequency of user location instances may vary depending on the particular implementation. For example, sensor device 130 may record movement information when the user starts moving or stops moving. For continuous movement (e.g., walking), sensor device 130 may record the location and type of movement periodically (e.g., every second or fraction of a second, etc.). As indicated herein, in various implementations, a sequence or series of contiguous user locations constitute a route in the living space.

In some implementations, there may be multiple routes within a given space. For example, a larger room such as a family room may have multiple routes, which may cross or merge. As such, there may be multiple sets of contiguous user locations in a given space.

As described in more detail herein, within a set of user locations, the user locations may include initial user locations, intermediate user locations, and final user locations. Each of these types of user locations is described in more detail herein.

As indicated herein, in various implementations, the user locations include initial user locations such as user location 302. In various implementations, sensor device 130 may determine an initial user location, where the initial user location represents an entry point of the living space. In some implementations, the initial user location may be the first instance of detection at a predetermined distance from sensor device 130 after a predetermine time of no detection in the living space. For example, referring still to FIG. 4, if the user enters the living space (e.g., a room) within a predetermined detectable range of sensor device 130 (e.g., 1-2 feet away if sensor device as at the entry point), sensor device 130 will start detecting activity of the user. For example, the user may enter living space 300 through a door. Sensor device 130 may determine that the first user location such as user location 302 at which the user is detected is a door threshold/opening. This door threshold may be considered an initial user location. In some implementations, sensor device 130 may determine that a particular user location is an initial location based detection of activity at the particular user location being proceeded by a predetermined duration or dynamically determined period of inactivity. For example, the user may not have entered the area in a while (e.g., more than an hour, etc.). If after no activity, sensor 130 may detect the user and continue to detect movement from the user within the living space. This would indicate that the user entered the living space and remains in the living space at least for the moment. Conversely, sensor 130 may detect movement from the user in the living space and then detects the user with the predefined range from sensor 130 (e.g., 1-2 feet away, at the door), then detects no activity for a predetermined period of inactivity (e.g., 30 seconds, 60 seconds, etc.). This would indicate that the user exited the living space at least for the moment. In various implementations, sensor device 130 and other devices may correlate routes between different rooms, which enables the sensor devices to determine the layout of an entire residence.

In some implementations, sensor device 130 may determine one or more times that the user is at each user location. Sensor device 130 may also determine a time duration that the user spends at each location. In some implementations, the time duration that is longer than a predetermined dynamically determined threshold may indicate a stationary user location. For example, a stationary user location may be next to a desk where the user may sit for a longer time period (e.g., 30 minutes, 60 minutes, etc.). In some implementations, a time duration that is shorter than the predetermined or dynamically determined threshold may indicate a transitioning user location. For example, transitioning or transitory user locations may include user locations along a route from a door to the desk. For example, user location 312 may be considered a transitory user location, and there may be numerous transitory user locations along a route.

In various implementations, the user locations may include intermediate user locations. In various implementations, sensor device 130 may determine one or more intermediate user locations. Intermediate user locations may include a transitory user location (e.g., along a walking path). Intermediate user locations may include multiple user locations during continuous movement (e.g., while walking, etc.). Intermediate user locations may also include locations where the user stops for a brief moment (e.g., to pick up an item from a table top). Intermediate user locations may also include locations where the user stays for a longer periods of time. For example, in some implementations, the one or more intermediate user locations may represent one or more task areas in the living space. A task area may be a particular location where a user performs a particular action, or task. A task may include sleeping, sitting, standing, working, eating, etc.

In some implementations, sensor device 130 may classify each object based on various factors such as time durations of no location change, inactivity, low activity, or combination thereof. For example, if sensor device 130 detects that the user remains in the same location as a particular object for at least a predetermined time period or a predetermined time period range (e.g., 3 hours or more, etc.) with little to no movement, sensor device 130 may classify the object as a bed. This would be consistent with the user sleeping with little or movement for a time period. In another example, if sensor device 130 detects that the user remains in the same location as a particular object for a different predetermined time period or time or time period range (e.g., between 1 and 3 hours, etc.) with little to no movement, sensor device 130 may classify the object as a sofa. This would be consistent with the user watching television or reading a book. In various implementations, sensor device 130 may detects patterns of behavior in order to continually improve the classification of each object.

In some implementations, sensor device 130 may determine a final location among multiple user locations, wherein the final location may represent an exit point of an area of the living space. For example, if the user is moving in the living space within the detectable range of sensor device 130, sensor device 130 will continue to detect activity of the user. If the user leaves the area within the detectable range of sensor device 130, sensor device 130 will stop detecting activity of the user. For example, the user may exit the area by walking through a doorway. Sensor device 130 may determine that the last user location, such as user location 322, before losing track of the user is a door threshold/opening. This door threshold may be considered a final user location.

In some implementations, sensor device 130 may determine that a particular user location is a final location based on an absence of activity detection (e.g., no activity) after a predetermined or dynamically determined period of time. For example, the user may have left the area for a while (e.g., more than an hour, etc.).

In some implementations, the final user location may be the same as the initial user location. For example, a bedroom may have one door used by the user to both enter and exit the room or area. In some implementations, the final user location may be different from the initial user location. For example, some areas such as living rooms and kitchens have multiple access points.

Figure 5:
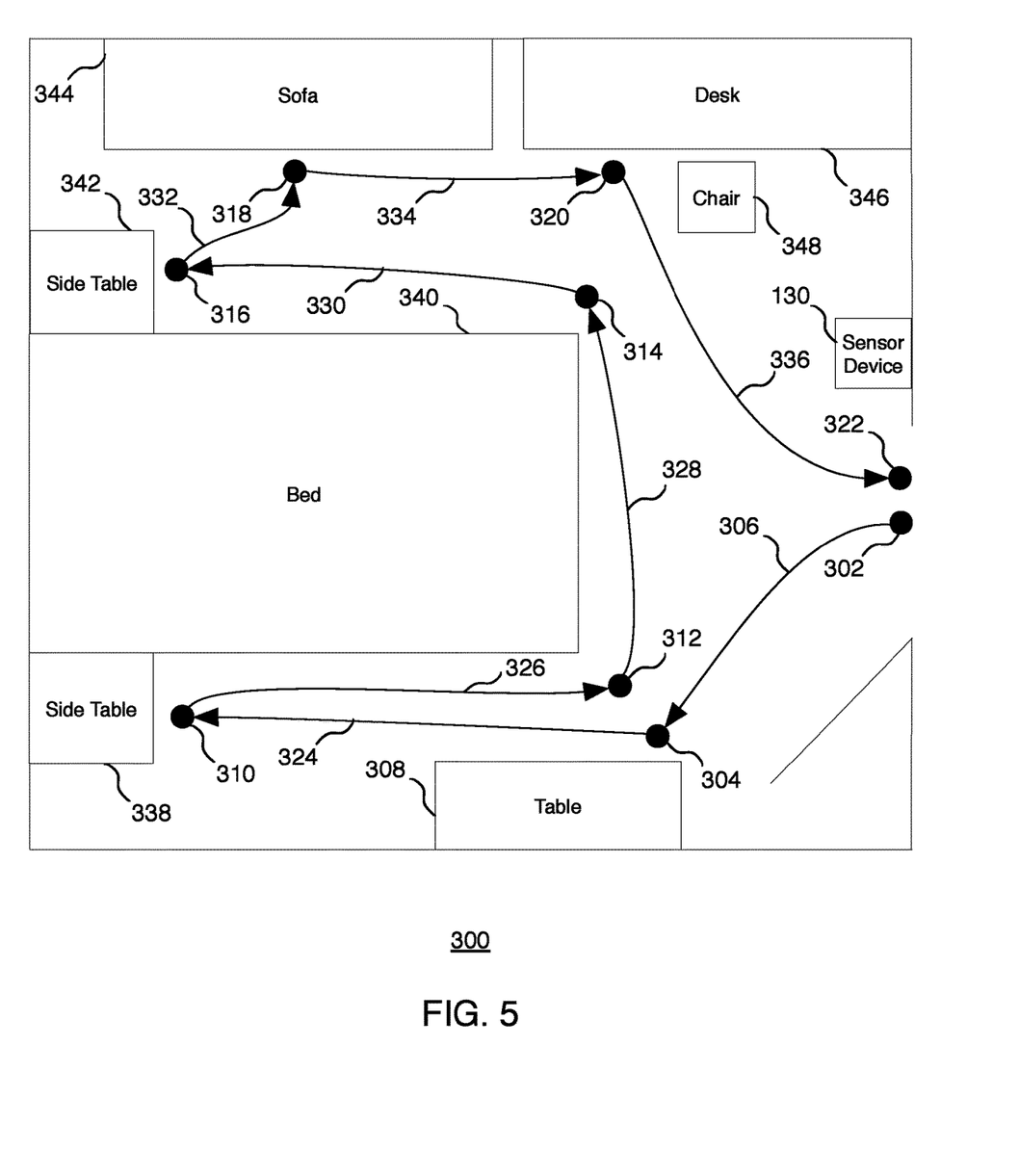
FIG. 5 illustrates a block diagram of a living space, including objects in the living space, according to some implementations.

FIG. 5 illustrates a block diagram of living space 300, including objects in living space 300, according to some implementations. Shown are table 308, side table 338, bed 340, side table 342, sofa 344, desk 346, and chair 348. In various implementations, the objects may be fixed objects (e.g., counters, stairs, some appliances, etc.). The particular fixed objects in a given living space may vary, depending on the particular scenario. For example, fixed objects may include walls, furniture (e.g., beds, sofas, tables, entertainment centers, etc.), appliances (e.g., refrigerators, stoves, ovens, etc.), and other objects in the living space that a user would only occasionally or never move. Objects may also include semi-fixed objects (e.g., tables, sofas, etc.). For example, semi-fixed objects may include chairs, small tables, and other objects in the living space that a user may move more frequently. Objects may also be non-fixed (e.g., chairs, etc.). In various implementations, sensor device 130 may determine whether a particular object is a fixed object, a semi-fixed object, or a non-fixed object based on movement information associated with a person and/or an object. In some implementations, sensor device 130 may determine the type of object (e.g., beds, sofas, tables, entertainment centers, refrigerators, stoves, ovens, etc.) based on the user activity information. For example, if the user lies down every night for a long duration (e.g., 7 hours, etc.), sensor device 130 makes a determine that the object on which the user lies down is a bed.

In various implementations, sensor device 130 may determine a confidence value for each object based on one or more of the user locations. As indicated herein, sensor device 130 may determine routes in a given area based on user locations. In various scenarios, object locations are different from the user locations in that an object and a user would not occupy the same space at the same time. It may be presumed that routes surround fixed objects in the space. As such, sensor device 130 may deem locations that do not coincide with a route as being occupied by an object.

Some objects such as tables most like stay in the same position for a long time period (e.g., months). Sensor device 130 may determine the routes consistently pass around particular fixed objects such as tables. In some implementations, the more times and/or the longer time period that routes do not overlap with a given object, the confidence value increases that an object is present at a particular location.

Some objects such as beds and sofas may also stay stationary, in the same location, for a long time period (e.g., months). Sensor device 130 may determine that routes generally pass around such fixed objects, but also that the user will generally share the same space (e.g., sit or lie on a sofa or bed, etc.). In some implementations, sensor device 130 may decrease the confidence value due to the shared occupancy. In some implementations, sensor device 130 may adjust or increase the confidence value if sensor device 130 determines that the user remains stationary for a long period time (e.g., 1 hour on a sofa, 8 hours on a bed).

In various implementations, there may be multiple areas within a living space. For example, areas may include entries, living rooms, kitchens, dining rooms, hallways, bedrooms, bathrooms, etc. While sensor device 130 may be located in one area and thereby detect activity in the one area, other sensor devices may be located in other areas and thereby detect activity in those other respective areas.

In various implementations, multiple sensor devices may share information in order to aggregate route information from different living spaces (e.g., different rooms in a residence), in order to generate a layout of an entire residence.

In various implementations, the sensor devices of residential sensor device platform 100 socialize with each other by sharing information with each other and learning from each other. For example, in various implementations, sensor device 130 exchanges activity information with other sensor devices in the network of sensor devices via a master sensor device and/or wireless router. For example, sensor device 130 may send activity information to one or more other sensor devices. Sensor device 130 may also receive activity information from one or more other sensor devices. As indicated above, the activity information may be exchanged among sensor devices via a master sensor device and/or wireless router. In some implementations, sensor device 130 may function as the master device.

In various implementations, the sensor devices share information and socialize based on one or more attributes. Different sensor devices may share intelligence with other sensor devices in order to optimize protocols of the applications. In some implementations, one attribute may be a particular group to which a given sensor device belongs. For example, one or more sensor devices may belong to a particular ambient sensor group. One or more sensor devices may belong to a particular physical location (e.g., a particular room, a particular portion of a house, etc.). In some implementations, a group of sensor devices need not be in the same house or may be in exterior living spaces as well as interior living spaces.

In various implementations, one sensor device may be a part of multiple groups, where each group may serve one or more different purposes. For example, a group of sensor devices may be implemented in connection with a variety of applications.

As indicated herein, in various implementations, sensor device 130 exchanges activity information with other sensor devices in the network of sensor devices via a master sensor device and/or wireless router. In some implementations, sensor device 130 may function as the master device.

Although the steps, operations, or computations may be presented in a specific order, as shown in the example of FIG. 4, the order may be changed in particular implementations. The ordering of blocks 202 through 206 is merely one example ordering. Other orderings of the blocks/steps are possible, depending on the particular implementation. For example, blocks 202 through 206 may occur simultaneously, or in any order.

Figure 6:
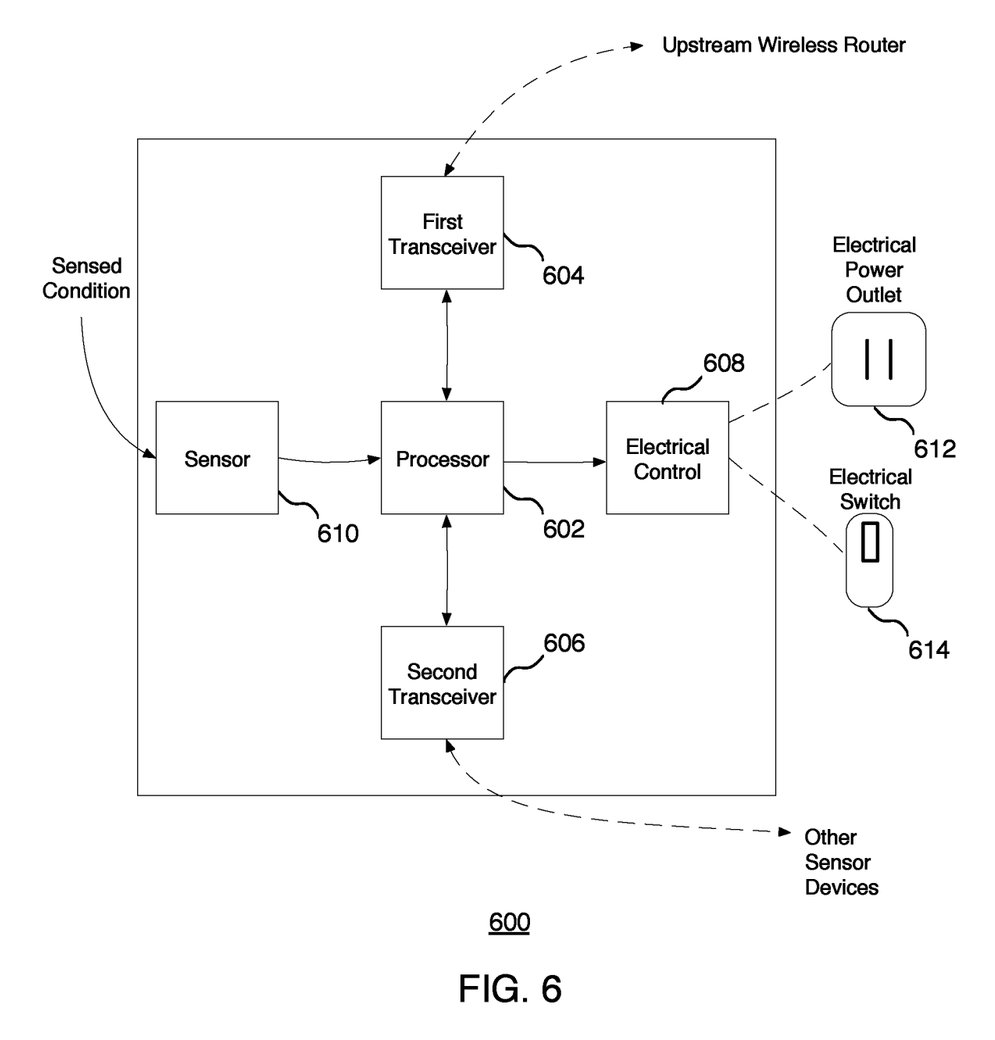
FIG. 6 illustrates a block diagram of an example sensor device, according to some implementations.

FIG. 6 illustrates a block diagram of an example sensor device 600, according to some implementations. In various implementations, sensor device 600 is a residential sensor device that is implemented in residential environments. Sensor device 600 may also be referred to as residential sensor device 600. Sensor device 600 is not limited to residential environments and may be implemented in non-residential environments, including both indoor and outdoor environments. In various implementations, sensor device 600 may be used to implement sensor device 120 of FIG. 1 and/or any of the other sensor devices of FIG. 1.

As shown, for this particular implementation, residential sensor device 600 may be used to implement one or more of multiple sensor devices in a network, such as a wireless network, a wireless mesh network, etc.

In various implementations, when a first sensor device is configured, the rest of the sensor devices are self-configuring in that they automatically configure themselves based on the configuration of the first sensor device.

As described in more detail below, sensor device 600 has a multi-virtual network interface (e.g., a dual interface, etc.). In some implementations, one interface may be used for an uplink mode (e.g., Internet mode) to link to a wireless router, etc. In some implementations, a second interface may be used for a mesh mode to link to mesh nodes, etc. For example, in various implementations, sensor device 600 includes a controller or processor 602. In various implementations, sensor device 600 also includes a first transceiver 604 operative to support uplink communication with a wireless router. In various implementations, the wireless router is an upstream wireless router. Sensor device 600 also includes a second transceiver 606 operative to support mesh link communication with other sensor devices. Sensor device 600 also includes an electrical control 608 that controls one or more electrical power outlets 612 and/or one or more electrical switches 614. In various implementations, sensor device 600 includes a sensor 610 operative to sense a condition of a living space. For ease in illustration, one sensor 610 is shown. However, in various implementations, sensor 610 may represent multiple sensors. For example, sensor device 600 may include a light sensor, a motion sensor, a thermometer, a barometer, a moisture sensor, etc. In some implementations, processor 602 is operative to communicate with the wireless router through the first transceiver, communicate with other sensor devices through the second transceiver, and receive the sensed condition of the living space. As indicated herein, a living space may include indoor and outdoor spaces.

In various implementations, if sensor device 600 functions as a master sensor device, sensor device 600 is configured with a dual link, having both an uplink to the upstream wireless mesh router and a mesh link to the other sensor devices of the mesh network. In various implementations, the other sensor devices of the mesh network (e.g., slave sensor devices) are configured only with the mesh link.

If any new sensor device is added to the mesh network, the new sensor device may self configure similar to the other non-master sensor devices of the wireless mesh network. As such, implementations provide automatic-range extender functionality.

In various implementations, one or more processors of the sensor devices are operative to select a master sensor device from the sensor devices, where the master sensor device maintains communication with the wireless router, and where other sensor devices of the sensor devices are designated as slave sensor devices and form a wireless mesh network with the other sensor devices through wireless communication with the other sensor devices through the second transceivers of the slave sensor devices.

For ease of illustration, FIG. 6 shows one block for each of processor 602, first transceiver 604, second transceiver 606, electrical control 608, sensor 610, electrical power outlet 612, and electrical switch 614. Each of blocks 602, 604, 606, 608, 610, 612, and 614 may represent multiple first transceivers, second transceivers, electrical controls, sensor devices, processors, electrical power outlets, and electrical switches.

In other implementations, sensor device 600 may not have all of the components shown and/or may have other elements including other types of elements instead of, or in addition to, those shown herein. For example, sensor device 600 may be implemented by computing device 600 of FIG. 6, which is described in more detail below. In various implementations, sensor device 600 may include a combination of some or all of the elements shown in FIG. 6, and may include other types of elements instead of, or in addition to, those shown in FIG. 6.

In some example implementations, sensor device 600 function as a master sensor device. However, other sensor devices may also function as master sensor devices. Also, in some scenarios, sensor device 600 may function as a slave sensor device relative to another master sensor device. In some implementations, the residential sensor device platform may include multiple different master sensor devices at a given time. For example, there may be multiple master sensor devices for different applications.

In various implementations, sensor device 600 and the sensor devices of the residential sensor device platform may be referred to as a hybrid mesh, because the sensor devices may have functions and capabilities of a mesh network, and the sensor devices may also have one or more master sensor devices simultaneously or serially. In various implementations, the sensor devices of the residential sensor device platform may include point-to-point plus repeater functionality.

Link or interface differentiation between the master sensor device and the mesh versus the master device and the wireless router may be achieved according to the following implementations. For example, in various implementations, the different links are dual interfaces in that one interface is among sensor devices of a mesh network, and a different, separate interface is between the master sensor device and a wireless router. In various implementations, the different links may be implemented as a dual interface or dual channel using a common radio, or multiple links or channels of a common radio.

In some implementations, one or more processors of respective sensor devices are operative to select the master sensor device from the sensor devices, where the master sensor device maintains communication with the upstream wireless router. In various implementations, as indicated above, the non-master sensor devices of the wireless sensor devices are designated as slave sensor devices. In various implementations, the wireless devices form a wireless mesh network through wireless communication through their respective second transceivers.

In some implementations, each sensor device checks or determines its proximity to the access point or upstream wireless router. In some implementations, the proximity is estimated based on the signal strength or signal quality of signals received by the device from the upstream wireless router. The sensor device having the highest received signal strength of the highest signal quality wins. That sensor device with the highest signal quality is selected as the master sensor device, and the other sensor devices are designated as the slave sensor devices. In some implementations, the sensor device closest to a home access point becomes the master sensor device with dual interface (e.g., active, active). The other sensors devices become slaves and participate in client mode (e.g., active, passive).

In some implementations, mobile applications may directly connect to any sensor device. In some implementations, each sensor device may configure itself through network sharing (e.g., physical unclonable function (PUF) and/or advanced encryption standard (AES) 128-bit encryption, etc.). In various implementations, third-party devices may participate in the quasi-mesh network if authenticated. In some implementations, slave devices send data to a master device every predetermined time period (e.g., every 10 minutes, 15 minutes, etc.), which is configurable. In some implementations, a master sensor device packages data from all devices in a predetermined time period (e.g., 10-minute window, 15-minute window, etc.), and pushes the data to the cloud server, which in turn may push the data to one or more applications at predetermined time periods (e.g., every 10 minutes, 15 minutes, etc.). In some implementations, one or more applications may automatically synchronize data with the cloud servers at predetermined time interviews (e.g., hourly basis, etc.) if data is not pushed from the cloud server. Real-time info may be available on refresh or based on event policies. Applications directly interact with local devices.

In some implementations, if the selected master sensor device fails, the one or more processors of the sensor devices reselect the master sensor device from the other sensor devices. That is, the wireless mesh network formed by the sensor devices is operative to configure themselves to self-configure or self-heal if one or more of the sensor devices fail. For example, in some implementations, the self-healing may include sensor devices of the wireless mesh network selecting a new master sensor device if the present master sensor device fails. In various implementations, all sensor devices have dual link, uplink, and mesh link functionality, and any of the currently non-master sensor devices may be eligible to become a new master device. In some implementations, a sensor device that was previously a master sensor device and that was later replaced (e.g., due to failure or other reason, etc.) may again be selected as the new master sensor device based on one or more predetermined criteria (e.g., getting fixed, etc.).

In some implementations, the self-healing includes selecting new routing paths from the master device to downstream sensor devices if one or more of the sensor devices of the residential sensor device platform fail. In various implementations, the meshing functionality of the sensor devices provides auto-range extender functionality for other devices to participate as a network service provider.

In some implementations, the signal strength or quality determination and rankings are further used to identify the second best and/or third best signal strengths, and the sensor devices are ranked accordingly. These sensor devices can be used as backup master sensor devices if the current master sensor device fails for some reason. In various implementations, the ranking is based on signal strengths and may be used to determine a priority for backup. For example, in some implementations, the highest-ranking sensor device may be selected as the master sensor device. If the highest-ranking sensor device is not available, the next highest ranking sensor device may be selected as the master sensor device. If there is a tie, the master sensor device may be selected randomly or based on another aspect (e.g., proximity, etc.).

In some implementations, one or more of the sensor devices are associated with one or more electrical power outlets and/or and one or more electrical light switches.

In various implementations, each of the one or more processors of the one or more of respective sensor devices is operative to control operation of the electrical control (which may in turn control one or more electrical power outlets and/or one or more electrical light switches) based on at least the sensed condition of the living space. In some implementations, the sensed condition may be based on various types of sensors (e.g., a light sensor, a motion sensor, a thermometer, a barometer, etc.) indicating various aspects of the living space.

In various implementations, each of the one or more processors of the one or more respective sensor devices is operative to control operation an electrical control (which may in turn control one or more electrical power outlets and/or one or more electrical light switches) based on at least the sensed occupancy of the living space. In some implementations, the sensed occupancy may be based on a motion sensor indicating that the living space is being occupied by a person. In some implementations, the sensed occupancy may include a sensed occupancy of a space proximate to the one or more sense devices. In some implementations, the sensed condition includes a sensed occupancy.

In various implementations, the sensed conditions and/or the sensed occupancy may be shared over the mesh network to control one or more of the power outlets or one or more of the electrical switches. The control may include turning the power of the one or more power outlets on or off, or switching the one or more electrical switches on or off.

In some implementations, one or more processors of sensor device 600, as well as those of other sensor devices, are operative to at least partially control operation of another device. In some implementations, the other devices may include one or more of a water heater, watering systems, garage door, etc. The sense information of sensor device 600 may be used to determine a condition of another device, and advantageously control the other device. For example, sensed occupancy (or the lack of) can be used to determine whether a water heater should be active or not. Generally, the other devices need not necessarily have a sensor. Such devices may rely on the sensing information of one of the sensor devices.

In some implementations, one or more processors of sensor device 600, as well as those of other sensor devices, are operative to at least partially control operation of the sensor devices themselves or another device based on timing. For example, situations can include control of certain lights of a residence that need to be turned on, for example, at 8:00 PM, but ideally also take in account occupancy within the residence. For example, front lights of a residence and back lights of the residence may be controlled differently depending upon occupancy within the residence.

In some implementations, one or more processors of sensor device 600, as well as those of other sensor devices, are operative to at least partially control operation of themselves or another device based on environmental parameters.

Figure 7:
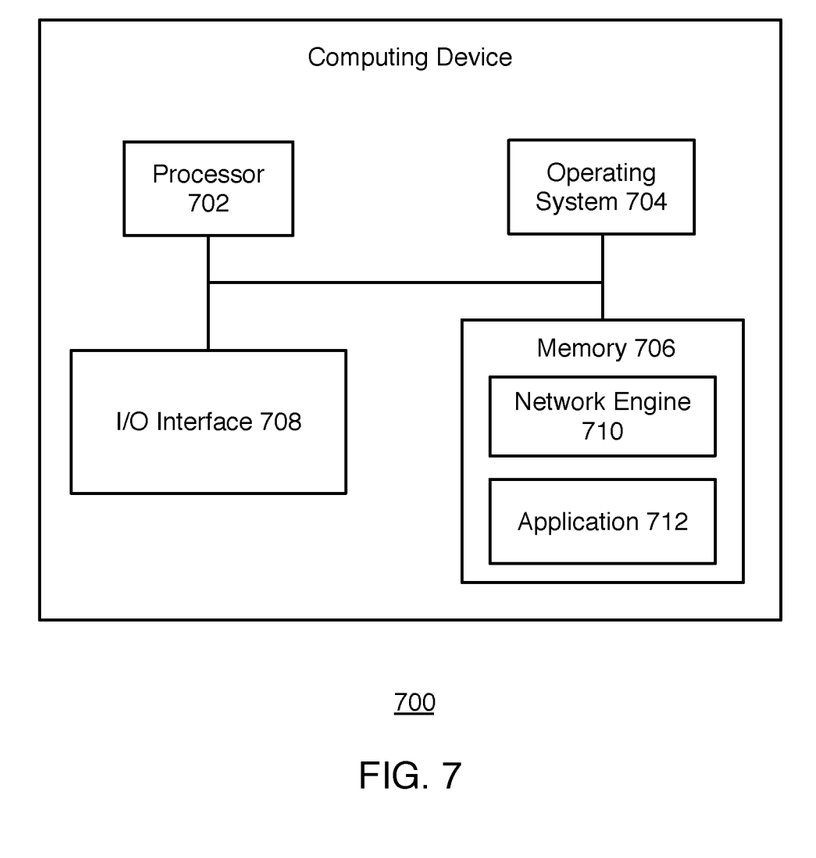
FIG. 7 illustrates a block diagram of an example computing device, according to some implementations.

FIG. 7 illustrates a block diagram of an example computing device 700, according to some implementations. For example, computing device 700 may be used to implement a sensor device such as sensor device 600 of FIG. 6, sensor device 120 and/or other sensor devices of FIG. 1, as well as to perform the implementations described herein. In some implementations, computing device 700 includes a processor 702, an operating system 704, a memory 706, and an input/output (I/O) interface 708. Computing device 700 also includes a network engine 710 and an application 712, which may be stored in memory 706 or on any other suitable storage location or computer-readable medium. Application 712 provides instructions that enable processor 702 to perform the functions described herein and other functions. For ease of illustration, one application 712 is shown. Application 712 may represent multiple applications. For example, multiple applications such as a security application may be stored in memory 706 and executed by processor 702.

For ease of illustration, FIG. 7 shows one block for each of processor 702, operating system 704, memory 706, I/O interface 708, network engine 710, and application 712. These blocks 702, 704, 706, 708, 710, and 712 may represent multiple processors, operating systems, memories, I/O interfaces, network engines, and applications. In other implementations, computing device 700 may not have all of the components shown and/or may have other elements including other types of elements instead of, or in addition to, those shown herein.

Although the description has been described with respect to particular implementations thereof, these particular implementations are merely illustrative, and not restrictive. Concepts illustrated in the examples may be applied to other examples and implementations. For example, some implementations are described herein in the context of a wireless mesh network system. However, the implementations described herein may apply in contexts other than a wireless mesh network.

Note that the functional blocks, methods, devices, and systems described in the present disclosure may be integrated or divided into different combinations of systems, devices, and functional blocks as would be known to those skilled in the art.

In some implementations, a non-transitory computer-readable storage medium carries program instructions thereon, where the instructions when executed by one or more processors cause the one or more processors to perform operations including one or more of the steps described herein.

In some implementations, a method includes one or more means for performing one or more of the steps described herein.

In some implementations, a system includes one or more processors, and logic encoded in one or more tangible media for execution by the one or more processors. When executed, the logic is operable to perform operations including one or more of the steps described herein.

In some implementations, a system includes a storage device, and one or more processors accessing the storage device and operable to perform operations including one or more of the steps described herein.

The foregoing description includes references to the accompanying drawings, which form a part of the detailed description. The drawings show specific implementations by way of illustration. In the various descriptions, these embodiments are also referred to herein as "implementations" and/or "examples." Such examples may include elements in addition to those shown or described. Such examples may optionally omit some elements mentioned. Moreover, such examples may include any combination or permutation of those elements shown or described (or one or more aspects thereof).

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or on multiple processors. Although the steps, operations, or computations may be presented in a specific order, the order may be changed in particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), solid state memory (e.g., flash memory, etc.), or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, etc.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication or transfer of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, they are intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A residential sensor system comprising:
   one or more sensors operative to sense activity in a living space, wherein the one or more sensors are integrated with one or more stationary devices, and wherein each stationary device of the one or more stationary devices is one of an electrical switch and an electrical outlet;
   one or more processors; and
   one or more non-transitory computer-readable storage media carrying program instructions thereon for execution by the one or more processors and when executed operable to perform operations comprising:
   determining a plurality of user locations of at least one first user of one or more users;

receiving activity information collected by the one or more sensors, wherein the activity information includes sensed activity of the at least one first user at the plurality of user locations;

controlling operations of electrical control of the one or more stationary devices based on the sensed activity of the at least one first user at the plurality of user locations;

generating at least one route of one or more routes in the living space based on a series of the plurality of user locations, wherein the series of the plurality of user locations constitute the at least one route; and determining one or more object locations of one or more objects in the living space based on the one or more routes.

2. The residential sensor system of claim 1, wherein the activity information comprises movement information, and wherein the movement information comprises one or more of location information and time-of-movement information.

3. The residential sensor system of claim 1, wherein, to generate the at least one route, the instructions when executed are further operable to perform operations comprising determining a sequence of contiguous user locations of the plurality of user locations.

4. The residential sensor system of claim 1, wherein the instructions when executed are further operable to perform operations comprising determining an initial user location of the plurality of user locations, and wherein the initial user location represents an entry point of the living space.

5. The residential sensor system of claim 1, wherein the instructions when executed are further operable to perform operations comprising determining one or more intermediate user locations of the plurality of user locations, and wherein the one or more intermediate user locations represents one or more task areas in the living space.

6. The residential sensor system of claim 1, wherein the one or more objects are fixed objects.

7. The residential sensor system of claim 1, wherein the instructions when executed are further operable to perform operations comprising determining a confidence value for each object based on the plurality of user locations.

8. A non-transitory computer-readable storage medium carrying program instructions thereon, the instructions when executed by one or more processors are operable to perform operations comprising:

determining a plurality of user locations of at least one first user of one or more users;

receiving activity information collected by one or more sensors, wherein the activity information includes sensed activity of the at least one first user at the plurality of user locations;

controlling operations of electrical controls of one or more stationary devices based on the sensed activity of the at least one first user at the plurality of user locations, wherein each stationary device of the one or more stationary devices is one of an electrical switch and an electrical outlet, and wherein the one or more sensors are integrated with the one or more stationary devices;

generating at least one route of one or more routes in the living space based on a series of the plurality of user locations, wherein the series of the plurality of user locations constitute the at least one route; and determining one or more object locations of one or more objects in the living space based on the one or more routes.

9. The non-transitory computer-readable storage medium of claim 8, wherein the activity information comprises movement information, and wherein the movement information comprises one or more of location information and time-of-movement information.

10. The non-transitory computer-readable storage medium of claim 8, wherein, to generate the at least one route, the instructions when executed are further operable to perform operations comprising determining a sequence of contiguous user locations of the plurality of user locations.

11. The non-transitory computer-readable storage medium of claim 8, wherein the instructions when executed are further operable to perform operations comprising determining an initial user location of the plurality of user locations, and wherein the initial user location represents an entry point of the living space.

12. The non-transitory computer-readable storage medium of claim 8, wherein the instructions when executed are further operable to perform operations comprising determining one or more intermediate user locations of the plurality of user locations, and wherein the one or more intermediate user locations represents one or more task areas in the living space.

13. The non-transitory computer-readable storage medium of claim 8, wherein the one or more objects are fixed objects.

14. The non-transitory computer-readable storage medium of claim 8, wherein the instructions when executed are further operable to perform operations comprising determining a confidence value for each object based on the plurality of user locations.

15. A computer-implemented method for operation of a residential electrical switch sensor device platform, the method comprising:

determining a plurality of user locations of at least one first user of one or more users;

receiving activity information collected by one or more sensors, wherein the activity information includes sensed activity of the at least one first user at the plurality of user locations;

controlling operations of electrical controls of one or more stationary devices based on the sensed activity of the at least one first user at the plurality of user locations, wherein each stationary device of the one or more stationary devices is one of an electrical switch and an electrical outlet, and wherein the one or more sensors are integrated with the one or more stationary devices;

generating at least one route of one or more routes in the living space based on a series of the plurality of user locations, wherein the series of the plurality of user locations constitute the at least one route; and determining one or more object locations of one or more objects in the living space based on the one or more routes.

16. The computer-implemented method of claim 15, wherein the activity information comprises movement information, and wherein the movement information comprises one or more of location information and time-of-movement information.

17. The computer-implemented method of claim 15, wherein the generating the at least one route comprises determining a sequence of contiguous user locations of the plurality of user locations.

18. The computer-implemented method of claim 15, further comprising determining an initial user location of the plurality of user locations, and wherein the initial user location represents an entry point of the living space.

19. The computer-implemented method of claim 15, wherein the one or more objects are fixed objects.

20. The computer-implemented method of claim 15, further comprising determining a confidence value for each object based on the plurality of user locations.

* * * * *